United States Patent [19]

Lusk

[11] Patent Number: 4,578,293

[45] Date of Patent: Mar. 25, 1986

[54] COMPOSITE STRUCTURES AND A METHOD FOR IMPROVING THE SERVICE LIFE THEREOF

[75] Inventor: Donald I. Lusk, Mequon, Wis.

[73] Assignee: A. O. Smith Corporation, Milwaukee, Wis.

[21] Appl. No.: 582,006

[22] Filed: Feb. 21, 1984

[51] Int. Cl.⁴ .............................................. B27N 5/02
[52] U.S. Cl. ...................................... 428/35; 428/500; 428/515; 428/913; 524/81; 524/297; 264/345
[58] Field of Search ................ 428/35, 500, 515, 913; 523/305, 328; 264/79, 344, 345; 524/81, 297; 126/373

[56] References Cited

U.S. PATENT DOCUMENTS

| | | | |
|---|---|---|---|
| 4,167,597 | 9/1979 | Yoshida et al. | 428/35 X |
| 4,179,432 | 12/1979 | Molt | 260/45.75 |
| 4,289,815 | 9/1981 | Lee | 428/500 X |
| 4,421,805 | 12/1983 | Prader | 428/35 |
| 4,456,660 | 6/1984 | Colombo | 428/35 X |

OTHER PUBLICATIONS

B. D. Gesner, "Stabilization Against Chemical Agents" in W. L. Hawkins, ed., Polymer Stabilization, J. Wiley & Sons, Inc., pp. 353 and 371–374, (1972).
Plastics Engineering, Aug. 1978, "A New Primary Antioxidant for Polypropylene and ABS", Schurdak et al.
"Zinc Oxide Stabilization of PP Against Weathering", D. S. Carr et al., Modern Plastics, May 1980.
"Zinc Oxide/Synergist Systems Provide Improved UV Control" D. S. Carr et al., Modern Plastics, Jul. 1981.

*Primary Examiner*—Paul R. Michl
*Assistant Examiner*—Fred M. Teskin
*Attorney, Agent, or Firm*—Andrus, Sceales, Starke & Sawall

[57] ABSTRACT

A method and apparatus for improving the service life of thermoplastic resin articles exposed on one side to a fluid, such as heated water or air. The thermoplastic resin article, such as a pipe or tank liner, contains a minor proportion of an additive such as an anti-oxidant, an ultraviolet stabilizer, a plasticizer, or a heat stabilizer. During exposure to the fluid, the additive tends to migrate toward the exposed surface and be leached from the resin setting up a concentration gradient throughout the thickness of the resin article. A layer containing a quantity of the additive is applied to the outer unexposed surface of the thermoplastic article, and the concentration gradient causes the additive from the outer layer to diffuse inwardly through the wall of the article to replace the additive lost by exposure to the fluid, thereby substantially increasing the service life of the thermoplastic article and providing additional amounts of additive by an effective time release mechanism.

9 Claims, No Drawings

COMPOSITE STRUCTURES AND A METHOD FOR IMPROVING THE SERVICE LIFE THEREOF

BACKGROUND OF THE INVENTION

Thermoplastic resins, when fabricated into articles, such as pipes, tank liners, containers, and the like usually contain a small amount of one or more additives, such as anti-oxidants, plasticizers, ultraviolet stabilizers, or heat stabilizers. It is believed that the additives normally do not undergo any reaction with the resin, but exist in the resin matrix as a separate phase.

It has been found that when thermoplastic resin articles are exposed to a fluid, particularly a heated fluid under pressure, such as hot water, the additives tend to be leached out of the resin, with the result that the additive is quickly depleted and the service life of the resin article is severely shortened.

SUMMARY OF THE INVENTION

The invention is directed to a method and apparatus for improving the service life of thermoplastic articles that are exposed on one side to a fluid, such as heated water or air. The thermoplastic article, such as a pipe, tank liner, container, or the like, contains a small proportion, up to about 5%, of one or more additives which can take the form of anti-oxidants, ultraviolet stabilizers, plasticizers, heat stabilizers, or the like. During exposure to the fluid, the additive tends to migrate toward the exposed surface setting up a concentration gradient throughout the wall thickness of the article.

In accordance with the invention, a layer containing additional concentrations of the additive is disposed on the outer surface of the resin article, which is not exposed to the fluid. The concentration gradient causes the additive from the outer layer to diffuse inwardly through the thermoplastic article to replace the additive lost by exposure to the fluid, thereby substantially increasing the service life of the article.

The outer layer can take the form of a coating of the additive sprayed, or otherwise applied, to the outer surface of the article, or it can take the form of a film of thermoplastic resin containing the additive and wrapped around the article. In either case, the additive, due to the concentration gradient, will diffuse inwardly into the thermoplastic article to replace the additive lost through exposure to the fluid.

Other objects and advantages will appear in the course of the following description.

DESCRIPTION OF THE ILLUSTRATED EMBODIMENT

The invention is applicable to thermoplastic resin articles, such as pipes, tank liners, containers, or the like, in which the article is exposed only on one surface to a fluid. The invention has particular application to thermoplastic resin articles which are exposed to a heated fluid under pressure, such as heated water since pressure increases the leaching of the additive by the fluid.

The thermoplastic resin can be any conventional type as for example polyolefin resins, such as polyethylene and polyproplyene, polyvinylchloride; nylon, and the like.

Depending on the particular environment of use and the product involved, the thermoplastic resin may contain one or more additives in an amount up to about 5% of each. For example, the resin may contain anti-oxidants selected from the group consisting of tris (3,5-di-tert.butyl-4-hydroxyphenyl)phosphate, 4,4'-thiobis(3-methyl-6-tert.butyl phenol), sym.di-naphthyl-p-phenylene diamine, tetrakis[methylene-3(3',5-di-tert.butyl-4'-hydroxyphenyl)propionate]-methane, N,N'-diphenyl-p-phenylene diamine, 2,2'-methylene-bis [4-methyl-6(2-methyl cyclohexyl)phenol], 2,2'-methylene-bis(4-methyl-6-tert butyl phenol), - octadecyl-3(3',5'-di-tert butyl-4'-hydroxyphenyl)propionate, 1,3,5-trimethyl-2,4,6-tris(3,5-di-tert.butyl-4-hydroxybenzyl) benzene, 1,1,3-tri(2-methyl-5-tert. buyl-4-hydroxyphenyl)n-butane, 2,2'-thiobis (4-methyl-6-tert.butyl phenol), 1,1'thiobis(2-naphthol), polymerized 1,2-dihydro-2,2,4-trimethyl quinoline, phenyl-2-naphthyl amine, and bis(4-tert.butyl phenyl)phosphorhydrazido thionate.

The additive may also take the form of ultraviolet stabilizers, such as 2-hydroxy benzophenones, and more particularly, 2-hydroxy-4-octyloxy-benzophenone, and 2-hydroxy-4-dodecyloxy-benzophenone.

Thermal stabilizers such as di(n-oxtyl)tin maleate can be used as the additive.

In addition, the thermoplastic resin can also contain a plasticizer, such as dibutylphthalate, dioctyphthalate and di-monophenol phosphate.

It is believed that no reaction occurs between the additives and the thermoplastic resin, but instead the additive is uniformly dispersed and exists as a separate phase in the resin matrix.

It has been found that when one surface of the thermoplastic article is exposed to a fluid, a leaching or migration of the additive occurs in which the additive migrates toward the exposed surface and is carried away by the fluid. This results in a concentration gradient occurring across the thickness of the article, causing a transfer of the additive in a direction toward the exposed surface by what is believed to be a diffusion process. This action progressively depletes the concentration of additive in the resin article, the result being that the service life of the article will be substantially decreased.

In accordance with the invention a layer containing the additive, in an amount generally above 1% by weight, is applied to the outer surface of the thermoplastic article, i.e. the surface which is not exposed to the fluid. The layer can be a coating containing the additive alone or in combination with other ingredients and can be sprayed, brushed, or otherwise coated onto the outer surface of the thermoplastic article. Alternately, the layer can take the form of a thermoplastic resin film containing a concentration, generally above 1% by weight, of the additive and wrapped around the outer surface of the thermoplastic article. The concentration of the additive in the outer layer is not critical, but higher concentrations in the added layer provide more efficient protection because they provide longer periods of replenishment of the additive.

During exposure of the thermoplastic resin article to the fluid, the leaching and migration of the additive within the thermoplastic resin toward the exposed surface will set up a concentration gradient causing a transfer of the additive not only from the outer regions of the thermoplastic resin article toward the exposed surface, but also from the outer layer which transfers quantities of additive in proportion with amounts lost by leaching. Thus, the outer layer serves as a time release storage reservoir for the additive and will be diffused into the thermoplastic article in proportion as the additive is depleted therefrom by leaching. The transfer of additive from the outer layer to the thermoplastic resin article will occur even though the outer layer is not integrally bonded to the thermoplastic article.

Through the invention, the service life of the thermoplastic resin article can be inexpensively tailored to specific service conditions.

It is contemplated that in some installations the additive contained in the outer layer may not be present in the thermoplastic resin liner, and exposure of the liner to a fluid will cause the additive in the outer layer to migrate into the liner, thereby enabling the liner to receive the beneficial affect of the additive.

Various modes of carrying out the invention are contemplated as being within the scope of the following claims particularly pointing out and distinctly claiming the subject matter which is regarded as the invention.

I claim:

1. A composite structure, comprising a container formed of a thermoplastic resin and having an inner surface and an outer surface, a fluid under pressure contained within the container and disposed in contact with the inner surface, said thermoplastic resin containing an additive beneficial to the physical properties of said resin, and an outer solid layer disposed on said outer surface of the container and containing a concentration of said additive, exposure of said container to said fluid causing migration of said additive in the container toward said inner surface to thereby set up a concentration gradient causing the additive from said outer layer to migrate across the interface between said outer layer and said container to replace the additive lost through exposure to said fluid.

2. The structure of claim 1, wherein said fluid is heated water under pressure and said container is a tank to contain said heated water.

3. The structure of claim 1, wherein said resin, prior to exposure to said fluid, contains up to 5% by weight of said additive and said layer contains in excess of 1% by weight of said additive.

4. The structure of claim 1, wherein said thermoplastic resin is a polyolefin and said additive is an anti-oxidant.

5. The structure of claim 1, wherein said additive is selected from the group consisting of an anti-oxidant, an ultraviolet stabilizer, a thermal stabilizer and a plasticizer.

6. The structure of claim 1, wherein said layer comprises a coating consisting essentially of said additive.

7. The structure of claim 1, wherein said layer comprises a thermoplastic film disposed on said outer surface and containing said additive.

8. A method of increasing the service life of a thermoplastic resin container exposed in service to heated water under pressure, comprising the steps of incorporating into said thermoplastic resin an additive beneficial to the physical properties of said resin in an amount up to 5% by weight of material containing a concentration of said additive to the outer surface of said container, said additive in said outer layer migrating across the interface between said outer layer and said container to replace the additive lost through exposure to said water.

9. The method of claim 8, wherein said step of applying a layer comprises applying a film of thermoplastic resin containing said additive to said outer surface.

* * * * *